(12) United States Patent
Krishnamoorthy (10) Patent No.: US 11,314,783 B2
(45) Date of Patent: Apr. 26, 2022

(54) SYSTEM FOR IMPLEMENTING COGNITIVE SELF-HEALING IN KNOWLEDGE-BASED DEEP LEARNING MODELS

(71) Applicant: Bank of America Corporation, Charlotte, NC (US)

(72) Inventor: Madhusudhanan Krishnamoorthy, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 103 days.

(21) Appl. No.: 16/893,658

(22) Filed: Jun. 5, 2020

(65) Prior Publication Data
US 2021/0382916 A1 Dec. 9, 2021

(51) Int. Cl.
| | |
|---|---|
| *G06F 16/28* | (2019.01) |
| *G06F 16/22* | (2019.01) |
| *G06F 9/50* | (2006.01) |
| *G06N 3/08* | (2006.01) |
| *G06F 16/2458* | (2019.01) |

(52) U.S. Cl.
CPC .......... *G06F 16/285* (2019.01); *G06F 9/5061* (2013.01); *G06F 16/2228* (2019.01); *G06F 16/2458* (2019.01); *G06F 16/283* (2019.01); *G06N 3/08* (2013.01)

(58) Field of Classification Search
CPC ............... G06F 16/285; G06F 16/2458; G06F 16/2228; G06F 16/283; G06F 9/5061; G06N 3/08
See application file for complete search history.

(56) References Cited

U.S. PATENT DOCUMENTS

| | | |
|---|---|---|
| 6,507,726 B1 | 1/2003 | Atkinson et al. |
| 6,523,015 B1 | 2/2003 | Bera et al. |
| 6,894,972 B1 | 5/2005 | Phaal |
| 7,023,979 B1 | 4/2006 | Wu et al. |
| 7,219,085 B2 | 5/2007 | Buck et al. |
| 2002/0159641 A1 | 10/2002 | Whitney et al. |
| 2002/0184408 A1 | 12/2002 | Hannigan et al. |
| 2003/0069869 A1 | 4/2003 | Gronau et al. |
| 2003/0088425 A1 | 5/2003 | Lam et al. |
| 2003/0097302 A1 | 5/2003 | Overhultz et al. |

(Continued)

*Primary Examiner* — Allen S Lin
(74) *Attorney, Agent, or Firm* — Moore & Van Allen PLLC; Anup Shrinivasan Iyer (57) ABSTRACT

Systems, computer program products, and methods are described herein for implementing cognitive self-healing in knowledge based deep learning models. The present invention is configured to receive, via the real-time resource transmission session, one or more query strings from the user; transform the one or more query strings into one or more multi-dimensional query vectors; electronically retrieve one or more multi-dimensional resource vectors from a resource repository; determine a similarity index between the one or more multi-dimensional query vectors and one or more multi-dimensional resource vectors; determine a first multi-dimensional resource vector associated with at least one of the one or more multi-dimensional resource vectors; rasterize the first multi-dimensional resource vector into one or more grid of pixels to generate a first resource; and display, via the real-time resource transmission session, the first resource.

18 Claims, 3 Drawing Sheets

(56) References Cited

U.S. PATENT DOCUMENTS

| | | |
|---|---|---|
| 2004/0059966 A1 | 3/2004 | Chan et al. |
| 2004/0078175 A1 | 4/2004 | Shaw et al. |
| 2004/0078363 A1* | 4/2004 | Kawatani ................ G06F 16/93 |
| 2005/0076245 A1 | 4/2005 | Graham et al. |
| 2005/0090911 A1 | 4/2005 | Ingargiola et al. |
| 2005/0132052 A1 | 6/2005 | Uttamchandani et al. |
| 2005/0228789 A1 | 10/2005 | Fawcett et al. |
| 2005/0267913 A1 | 12/2005 | Stienhans et al. |
| 2005/0278362 A1 | 12/2005 | Maren et al. |
| 2006/0247973 A1 | 11/2006 | Mueller et al. |
| 2007/0043690 A1 | 2/2007 | Inakoshi et al. |
| 2007/0111179 A1 | 5/2007 | Hochwarth et al. |
| 2014/0067761 A1* | 3/2014 | Chakrabarti ........ G06F 16/2336 707/634 |
| 2016/0342928 A1* | 11/2016 | Godwin ......... G06Q 10/063114 |
| 2020/0320348 A1* | 10/2020 | Yang .................... G06F 40/284 |
| 2021/0042965 A1* | 2/2021 | Phogat .................. G06T 11/001 |

\* cited by examiner

SYSTEM FOR IMPLEMENTING COGNITIVE SELF-HEALING IN KNOWLEDGE-BASED DEEP LEARNING MODELS

FIELD OF THE INVENTION

The present invention embraces a system for implementing cognitive self-healing in knowledge based deep learning models.

BACKGROUND

Entities of all sizes are constantly investigating new analytic tools to derive additional value from vast amount available resources. Analytic tools that enable users to search through the vast amount of resources must be able to search through unstructured and structured resources, running many queries at the same time, if possible in real-time. Any analytic tool providing such an option must take into account the volume, velocity, and variety of the resources to match the search query with the right resource.

There is a need for a system for implementing cognitive self-healing in knowledge based deep learning models.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for implementing cognitive self-healing in knowledge based deep learning models is presented. The system comprising: at least one non-transitory storage device; and at least one processing device coupled to the at least one non-transitory storage device, wherein the at least one processing device is configured to: initiate a real-time resource transmission session on a computing device associated with a user; electronically receive, via the real-time resource transmission session, one or more query strings from the user; transform the one or more query strings into one or more multi-dimensional query vectors; electronically retrieve one or more multi-dimensional resource vectors from a resource repository; determine a similarity index between the one or more multi-dimensional query vectors and one or more multi-dimensional resource vectors; determine a first multi-dimensional resource vector associated with at least one of the one or more multi-dimensional resource vectors based on at least determining the similarity index; rasterize the first multi-dimensional resource vector into one or more grid of pixels to generate a first resource; and transmit a first control signal configured to cause the computing device of the user to display, via the real-time resource transmission session, the first resource.

In some embodiments, the at least one processing device is further configured to: electronically retrieve one or more resources from one or more sources of information; transform the one or more resources into the one or more multi-dimensional resource vectors; and store the one or more multi-dimensional resource vectors in the resource repository.

In some embodiments, the at least one processing device is further configured to: electronically retrieve one or more multi-dimensional resource vectors from the resource repository; initiate one or more clustering algorithms on the one or more multi-dimensional resource vectors; generate, using the one or more clustering algorithms, one or more resource data clusters in a high-dimensional space based on at least the one or more multi-dimensional resource vectors.

In some embodiments, the at least one processing device is further configured to: initiate the one or more clustering algorithms on the one or more multi-dimensional query vectors; and generate, using the one or more clustering algorithms, one or more query data clusters in the high-dimensional space based on at least the one or more multi-dimensional query vectors.

In some embodiments, the at least one processing device is further configured to: determine the similarity index between the one or more multi-dimensional query vectors and one or more multi-dimensional resource vectors based on at least determining a distance between the one or more query data clusters and the one or more resource data clusters in the high-dimensional space.

In some embodiments, the at least one processing device is further configured to: determine that the distance between the one or more query data clusters and a first resource data cluster associated with the first multi-dimensional resource vector in the high-dimensional space is lesser than a predetermined threshold, wherein the first resource data cluster is associated with the one or more resource data clusters; and rasterize the first multi-dimensional resource vector into the one or more grid of pixels to generate the first resource based on at least determining that the distance between the one or more query data clusters and the first resource data cluster is lesser than the predetermined threshold.

In some embodiments, the at least one processing device is further configured to: electronically receive, via the real-time resource transmission session, the one or more query strings from the user; initiate an interpreter engine on the one or more query strings to extract structured information from the one or more query strings; transform the structured information associated with the one or more query strings into one or more multi-dimensional query vectors.

In some embodiments, the at least one processing device is further configured to: electronically receive, via the real-time resource transmission session, a multi-dimensional query vector, wherein the first multi-dimensional query vector is associated with the one or more multi-dimensional query vectors; and determine, using a state tracker engine, that a conversation state associated with the real-time resource transmission session has changed from an original conversation state to a first conversation state based on at least receiving the first multi-dimensional query vector.

In some embodiments, the at least one processing device is further configured to: initiate a policy engine associated with the real-time resource transmission session; electronically receive, via the policy engine, the first conversation state; determine one or more actions to be executed in response to the first conversation state, wherein the one or more actions comprises at least displaying the first resource; and initiate an execution of the one or more actions.

In some embodiments, the at least one processing device is further configured to: electronically receive, using the state tracker engine, the execution of the one or more actions in response to the first conversation state; and generate a log indicating the execution of the one or more actions in response to the first conversation state; and revert, using the state tracker engine, the conversation state associated with the real-time resource transmission session to the original conversation state from the first conversation state in response to generating the log.

In some embodiments, the at least one processing device is further configured to: transmit a second control signal configured to cause the computing device of the user to display one or more validation questions associated with the display of the first resource in response to the first multi-dimensional query vector; electronically receive, from the computing device of the user, one or more responses to the one or more validation questions; and generate one or more exceptions based on at least the one or more responses to the one or more validation questions.

In some embodiments, the at least one processing device is further configured to: initiate an exception handling routine on the one or more exceptions; transmit a third control signal configured to cause a computing device associated with a resource expert to display the one or more exceptions; electronically receive, via the computing device associated with the resource expert, one or more additional resources in response to the one or more exceptions; transform the one or more additional resources into one or more multi-dimensional additional resource vectors; and update the resource repository with the one or more multi-dimensional additional resource vectors.

In another aspect, a computer program product for implementing cognitive self-healing in knowledge based deep learning models is presented. The computer program product comprising a non-transitory computer-readable medium comprising code causing a first apparatus to: initiate a real-time resource transmission session on a computing device associated with a user; electronically receive, via the real-time resource transmission session, one or more query strings from the user; transform the one or more query strings into one or more multi-dimensional query vectors; electronically retrieve one or more multi-dimensional resource vectors from a resource repository; determine a similarity index between the one or more multi-dimensional query vectors and one or more multi-dimensional resource vectors; determine a first multi-dimensional resource vector associated with at least one of the one or more multi-dimensional resource vectors based on at least determining the similarity index; rasterize the first multi-dimensional resource vector into one or more grid of pixels to generate a first resource; and transmit a first control signal configured to cause the computing device of the user to display, via the real-time resource transmission session, the first resource.

In yet another aspect, a method implementing cognitive self-healing in knowledge based deep learning models is presented. The method comprising: initiating a real-time resource transmission session on a computing device associated with a user; electronically receiving, via the real-time resource transmission session, one or more query strings from the user; transforming the one or more query strings into one or more multi-dimensional query vectors; electronically retrieving one or more multi-dimensional resource vectors from a resource repository; determining a similarity index between the one or more multi-dimensional query vectors and one or more multi-dimensional resource vectors; determining a first multi-dimensional resource vector associated with at least one of the one or more multi-dimensional resource vectors based on at least determining the similarity index; rasterizing the first multi-dimensional resource vector into one or more grid of pixels to generate a first resource; and transmitting a first control signal configured to cause the computing device of the user to display, via the real-time resource transmission session, the first resource.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, a "resource" may generally refer to information associated with products, devices, goods, commodities, services, and/or the like and associated FAQs, manuals, troubleshooting guides, and runbooks. The information may be obtained from a number of different sources. In some embodiments, the information received from these different sources are validated by subject matter experts before storing them in the resource repository.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

Figure 1:
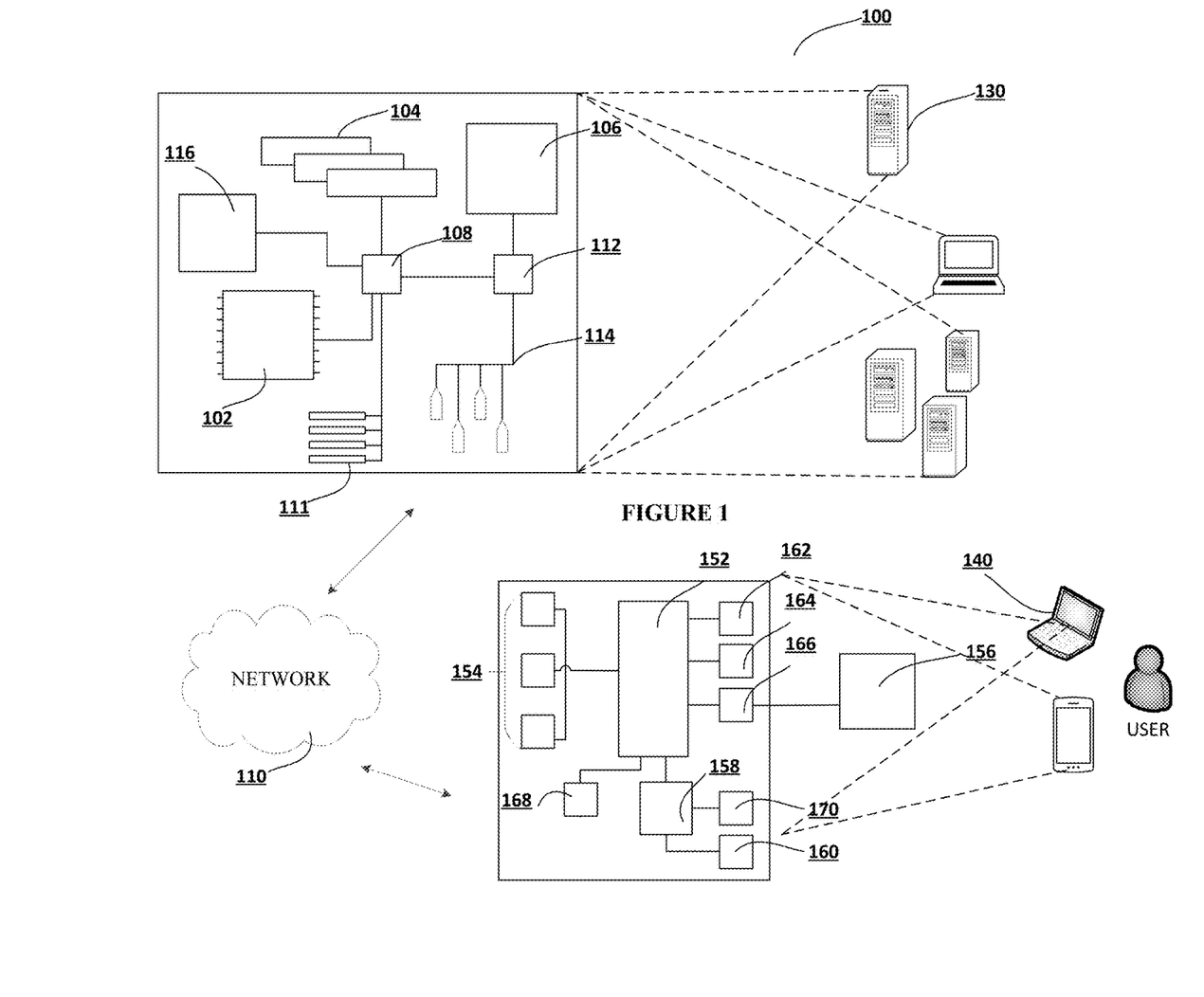
FIG. 1 illustrates technical components of a system for implementing cognitive self-healing in knowledge based deep learning models, in accordance with an embodiment of the invention.

FIG. 1 presents an exemplary block diagram of the system environment for implementing cognitive self-healing in knowledge based deep learning models 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute resource transfers using one or more applications stored thereon. The one or more applications may be configured to communicate with the system 130, execute a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application, and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

Entities of all sizes are constantly investigating new analytic tools to derive additional value from vast amount available resources. Analytic tools that enable users to search through the vast amount of resources must be able to search through unstructured and structured resources, running many queries at the same time, if possible in real-time. Any analytic tool providing such an option must take into account the volume, velocity, and variety of the resources to match the search query with the right resource. The present invention provides the functional benefit of using a conversation as a decision model to correlated data between disparate sources, and based on a confidence factor, keeps learning and improving.

Figure 2:
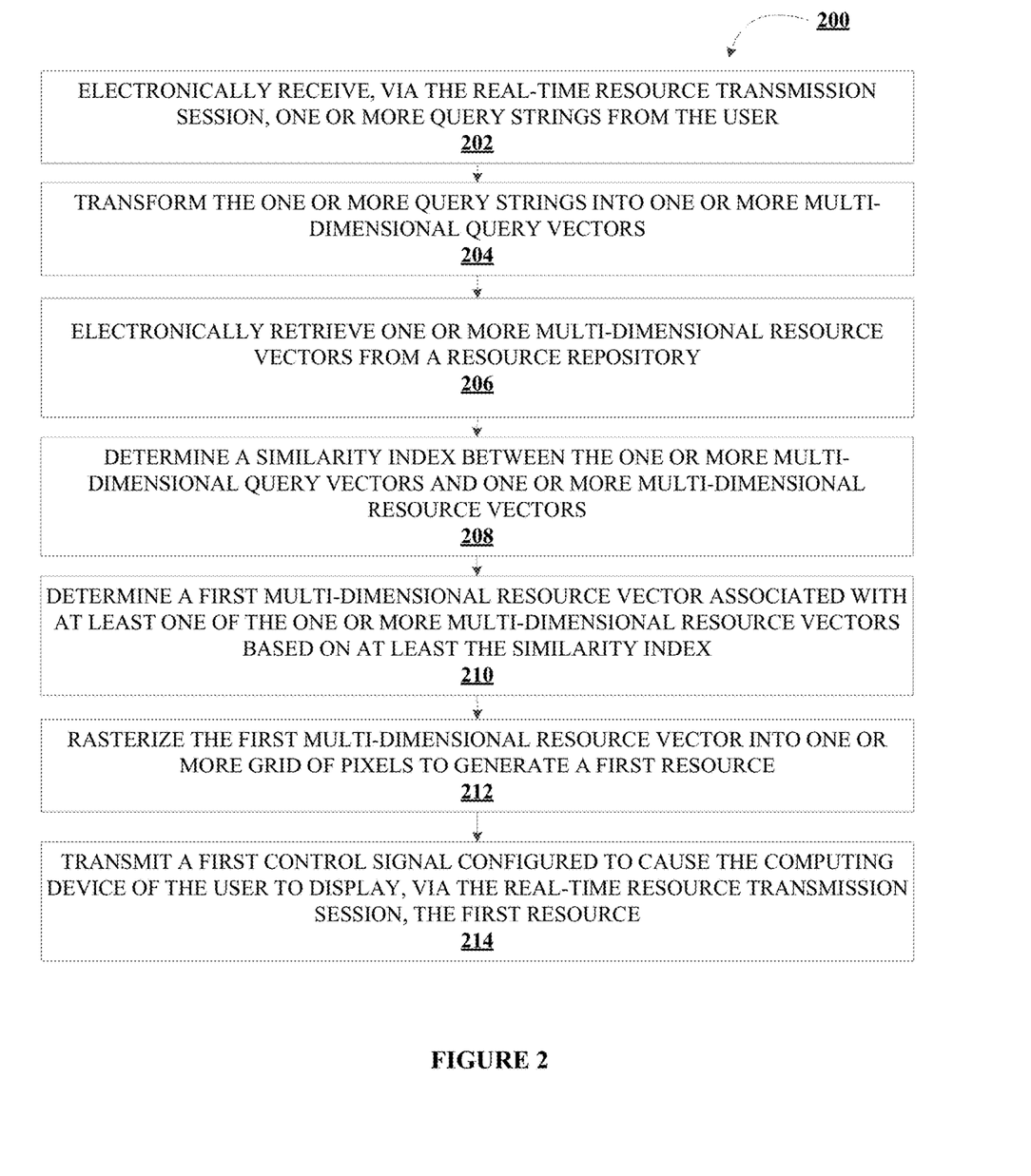
FIG. 2 illustrates a process flow for implementing cognitive self-healing in knowledge based deep learning models, in accordance to an embodiment of the invention.

FIG. 2 illustrates a process flow for implementing cognitive self-healing in knowledge based deep learning models 200, in accordance to an embodiment of the invention. In some embodiments, the system may be configured to initiate a real-time resource transmission session on a computing device associated with a user. Next, as shown in block 202, the process flow includes electronically receiving, via the real-time resource transmission session, one or more query strings from the user.

Next, as shown in block 204, the process flow includes transforming the one or more query strings into one or more multi-dimensional query vectors. In this regard, the system may be configured to initiate a vectorization engine on the one or more query strings. Representing the query strings as vectors (numerical) facilitates meaningful analytics to be performed and also creates the instances on which clustering algorithms (and machine learning algorithms) operate. Each property of the multi-dimensional vector representation may be a feature. For query strings, features represent attributes and properties—including its content as well as meta attributes, such as string length, author, source, and date. When considered together, the features of a query string describe a multi-dimensional feature space on which machine learning methods (e.g., clustering algorithms) can be applied. Thus, by initiating the vectorization engine, the system may be configured to map the query represented in a string of text into a multi-dimensional vector of real numbers. In one aspect, vectorizing the contextual and temporal data further includes decomposing the context-free and context-sensitive groupings into a weighted sum of vectors.

In some embodiments, the system may be configured to initiate the one or more clustering algorithms on the one or more multi-dimensional query vectors. In one aspect, clustering algorithms may be configured to group the vectors (e.g., multi-dimensional query vectors) in such a way that vectors in the same group (called a cluster) are more similar (in some sense) to each other than to those in other groups (clusters). Clustering algorithms may differ significantly in their understanding of what constitutes a cluster and how to efficiently find them. For example, a cluster may include groups of vectors with small distances between cluster members, dense areas of the data space, intervals or particular statistical distributions, and/or the like. Clustering can therefore be formulated as a multi-objective optimization problem. The appropriate clustering algorithm and parameter settings (including parameters such as the distance function to use, a density threshold or the number of expected clusters) depend on the individual data set and intended use of the results.

In some embodiments, the system may be configured to identify the clustering algorithm based on at least a cluster model. Examples of clustering model include, but are not limited to, connectivity-based clustering, centroid-based clustering, distribution-based clustering, density-based clustering, grid-based clustering, and/or the like. Each clustering model may be associated with one or more model-specific clustering algorithms. For example, connectivity-based clustering algorithms include hierarchical clustering analysis (HCA), single-linkage clustering, complete linkage clustering, unweighted or weighted pair group method with arithmetic mean, agglomerative clustering, divisive clustering, and/or the like; centroid-based clustering algorithms include k-means clustering and its variants; distribution-based clustering algorithms include Gaussian mixture model clustering, expectation-maximization algorithm, and/or the like; density-based clustering algorithms include density-based spatial clustering of applications with noise (DBSCAN), ordering points to identify the clustering structure (OPTICS), and/or the like; grid-based clustering algorithms include STatistical Information Grid (STING), subspace clustering, and/or the like. Each processing portion of the system 100 can additionally or alternatively leverage: a probabilistic module, heuristic module, deterministic module, or any other suitable module leveraging any other suitable computation method, clustering method, machine learning method, statistical analysis method, or combination thereof. Any suitable machine learning approach can otherwise be incorporated in the system 100. Further, any suitable model (e.g., machine learning, non-machine learning, clustering, non-clustering, etc.) can be used in generating data relevant to the system 130.

In response to initiating the clustering algorithms on the one or more multi-dimensional query vectors, the system may be configured to generate, using the one or more clustering algorithms, one or more query data clusters in the high-dimensional space based on at least the one or more multi-dimensional query vectors.

Next, as shown in block 206, the process flow includes electronically retrieving one or more multi-dimensional resource vectors from a resource repository. In some embodiments, the system may be configured to electronically retrieve one or more resources from one or more sources of information. In response to receiving the resources from various sources of information, the system may be configured to transform the one or more resources into the one or more multi-dimensional resource vectors. In this regard, the system may be configured to initiate the vectorization engine on the one or more resources. As described herein, representing the resources as vectors (numerical) facilitates meaningful analytics to be performed and also creates the instances on which clustering algorithms (and machine learning algorithms) operate. Each property of the multi-dimensional vector representation may be a feature. For resources, features represent attributes and properties—including its content as well as meta attributes, such as resource length, author, source, and date. When considered together, the features of a resource describe a multi-dimensional feature space on which machine learning methods (e.g., clustering algorithms) can be applied. Thus, by initiating the vectorization engine, the system may be configured to map the resource into a multi-dimensional vector of real numbers. In response to transforming the resources, the system may be configured to store the one or more multi-dimensional resource vectors in the resource repository.

In some embodiments, in response to transforming the resources into multi-dimensional resource vectors, the system may be configured to initiate one or more clustering algorithms on the one or more multi-dimensional resource vectors. As described herein, clustering algorithms may be configured to group the vectors (e.g., multi-dimensional resource vectors) in such a way that vectors in the same group (called a cluster) are more similar (in some sense) to each other than to those in other groups (clusters). In some embodiments, the system may be configured to generate, using the one or more clustering algorithms, one or more resource data clusters in a high-dimensional space based on at least the one or more multi-dimensional resource vectors.

Next, as shown in block 208, the process flow includes determining a similarity index between the one or more multi-dimensional query vectors and one or more multi-dimensional resource vectors. In some embodiments, the system may be configured to determine the similarity index between the one or more multi-dimensional query vectors and one or more multi-dimensional resource vectors based on at least determining a distance between the one or more query data clusters and the one or more resource data clusters in the high-dimensional space. In one aspect, the distance between the one or more query data clusters and the one or more resource data clusters in the high-dimensional space may be based on one or more distance measures, such as, Euclidean distance, Manhattan distance, Pearson Correlation distance, cosine distance, Spearman correlation distance, and/or the like.

Next, as shown in block 210, the process flow includes determining a first multi-dimensional resource vector associated with at least one of the one or more multi-dimensional resource vectors based on at least the similarity index. In some embodiments, the system may be configured to determine the first multi-dimensional resource vector determining that the distance between the one or more query data clusters and a first resource data cluster associated with the first multi-dimensional resource vector in the high-dimensional space is lesser than a predetermined threshold. In one aspect, the predetermined threshold may be a threshold distance measure. A lower threshold distance indicates that the data clusters are closer to each other and are thus have a higher similarity index. On the other hand, a higher threshold distance indicates that the data clusters are farther away from each other and thus have a lower similarity index.

Next, as shown in block 212, the process flow includes rasterizing the first multi-dimensional resource vector into one or more grid of pixels to generate a first resource. In some embodiments, the system may be configured to rasterize the first multi-dimensional resource vector into the one or more grid of pixels to generate the first resource based on at least determining that the distance between the one or more query data clusters and the first resource data cluster is lesser than the predetermined threshold. In some embodiments, rasterizing the multi-dimensional resource vectors converts the vectors into projected images, such as a video or still graphics. In one aspect, in response to initiating the rasterization process, the system may be configured to electronically receive information associated with one or more software and/or hardware configuration of the computing device of the user. In response to receiving the information, the system may be configured to identify the needs of the specific software and/or hardware configuration. Based on the needs, the system may be configured to initiate the rasterization process. By rasterizing the first multi-dimensional resource vector based on the software/hardware configuration of the computing device that is going to receive the resources, the system may be configured to generate the first resource so that the images are efficiently and optimally projected on the computing device of the user.

Next, as shown in block 214, the process flow includes transmitting a first control signal configured to cause the computing device of the user to display, via the real-time resource transmission session, the first resource. In some embodiments, the system may be configured to transmit a second control signal configured to cause the computing device of the user to display one or more validation questions associated with the display of the first resource in response to the first multi-dimensional query vector. In one aspect, the one or more validation questions may be used to determine a relation index between the first resource and first query string. In some embodiments, the relation index may be used to determine whether the first resource is an adequate response to the first query string. In response, the system may be configured to electronically receive, from the computing device of the user, one or more responses to the one or more validation questions. In some embodiments, the system may be configured to determine the relation index based on at least the responses received from the user to the validation questions. For example, a positive response to the validation question may result in an increase in the relation index while a negative response to the validation question may result in a decrease in the relation index. In one aspect, the one or more validation questions and the corresponding responses to the validation questions may be weighted. In such cases, the relation index may be a weighted average of responses to the validation questions.

In some embodiments, the system may be configured to generate one or more exceptions based on at least the one or more responses to the one or more validation questions and/or the relation index. In response, the system may be configured to initiate an exception handling routine on the one or more exceptions. In some embodiment, the system may be configured to transmit a third control signal configured to cause a computing device associated with a resource expert to display the one or more exceptions. In response, the system may be configured to electronically receive, via the computing device associated with the resource expert, one or more additional resources in response to the one or more exceptions. In response, the system may be configured to transform the one or more additional resources into one or more multi-dimensional additional resource vectors. Once transformed, the system may be configured to update the resource repository with the one or more multi-dimensional additional resource vectors.

Figure 3:
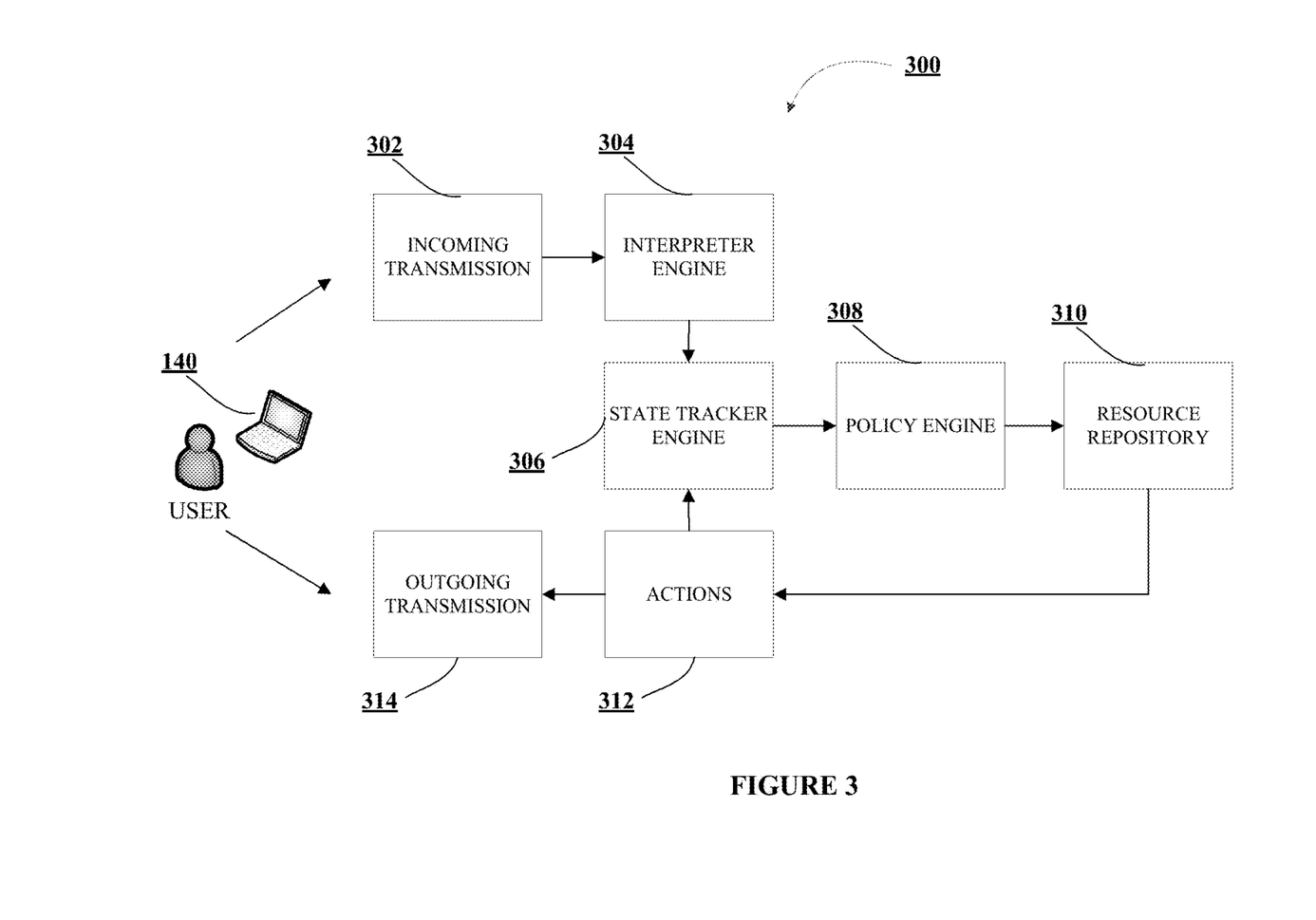
FIG. 3 illustrates a data flow model for implementing cognitive self-healing in knowledge based deep learning models, in accordance with an embodiment of the invention

FIG. 3 illustrates a data flow model for implementing cognitive self-healing in knowledge based deep learning models 300, in accordance with an embodiment of the invention. At step 302, the real-time resource transmission session receives an incoming transmission from the computing device of the user. As described herein, the incoming transmission may include one or more query strings. At step 304, the system initiates an interpreter engine on the one or more query strings. In one aspect, the interpreter engine may be configured to extract structured information from the one or more query strings. Based on the extracted structure information, the system may be configured to transform the one or more query strings into one or more multi-dimensional query vectors. In some embodiments, the structured information may include tokenizing the query. In one aspect, tokenization may refer to dividing the query string into tokens which can be used for further processing and understanding. Tokens may include words, numbers, identifiers, and/or punctuation (depending on the use case). In some embodiments, the structured information may include statistical extraction to identify context and intent, phrase extraction to extract sequences of tokens that have a strong meaning independent of the words when treated separately, word frequency, and/or any suitable meaningful information. In response to extracting the structured information, the system may be configured to transform the structured information associated with the one or more query strings into one or more multi-dimensional query vectors.

At step 306, the system initiates the state tracker engine to determine the state of the conversation. In some embodiments, with each query string received from the computing device of the user, the state tracker engine detects a change in the state of the real-time resource transmission session. Accordingly, in one aspect, the system may be configured to electronically receive, via the real-time resource transmission session, a multi-dimensional query vector, wherein the first multi-dimensional query vector is associated with the one or more multi-dimensional query vectors. In response, the system may be configured to determine, using a state tracker engine, that a conversation state associated with the real-time resource transmission session has changed from an original conversation state to a first conversation state based on at least receiving the first multi-dimensional query vector. In some embodiments, with a first query string, the state of the session may change from an original conversation state to a first conversation state. When the query is processed and a corresponding resource is transmitted to the user, the conversation state goes back to the original conversation state. Thus, for each query, the state of the real-time resource transmission session changes, and with each response to the query, the state of the real-time resource transmission session reverts to its original conversation state.

At step 308, the system initiates the policy engine to determine specific actions to be executed in response to the query strings. In this regard, the system may be configured to electronically receive, via the policy engine, the first conversation state. In response the system may be configured to determine one or more actions to be executed in response to the first conversation state. In one aspect, the or more actions may include identifying a first resource in response to the query string, and displaying the first resource on the computing device of the user. To achieve this, at step 310, the system establishes a communication link with the resource repository to retrieve the first resource in response to the first query string. One retrieved, as shown in step 312, the system initiates an execution of the one or more actions, i.e., transmitting the first resource to the computing device of the user. At step 314, the system generates the outgoing transmission. In one aspect, when the first resource is retrieved from the resource repository at step 310, the resource is still in a multi-dimensional vector format. Therefore, generating the outgoing transmission may include rasterizing the first multi-dimensional resource vector associated to generate the first resource. In response to generating the first resource, the system may configured to display the first resource on the computing device of the user 140.

In some embodiments, the system may be configured to electronically receive, using the state tracker engine, the execution of the one or more actions in response to the first conversation state. In response, the system may be configured to generate a log indicating the execution of the one or more actions in response to the first conversation state. In response, the system may be configured to revert, using the state tracker engine, the conversation state associated with the real-time resource transmission session to the original conversation state from the first conversation state in response to generating the log. In this way, the system may be configured to keep track of the queries being processed.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for implementing cognitive self-healing in knowledge based deep learning models, the system comprising:
    at least one non-transitory storage device; and
    at least one processing device coupled to the at least one non-transitory storage device,
    wherein the at least one processing device is configured to:
    initiate a real-time resource transmission session on a computing device associated with a user;
    electronically receive, via the real-time resource transmission session, one or more query strings from the user;
    transform the one or more query strings into one or more multi-dimensional query vectors;
    electronically retrieve one or more multi-dimensional resource vectors from a resource repository;
    determine a similarity index between the one or more multi-dimensional query vectors and the one or more multi-dimensional resource vectors;
    determine a first multi-dimensional resource vector associated with at least one of the one or more multi-dimensional resource vectors based on at least the similarity index;
    retrieve device configuration information associated with the computing device of the user;
    dynamically rasterize the first multi-dimensional resource vector into one or more grid of pixels to generate a first resource based on at least the device configuration information for optimal display of the first resource on the computing device of the user;
    transmit a first control signal configured to cause the computing device of the user to display, via the real-time resource transmission session, the first resource;
    transmit a second control signal configured to cause the computing device of the user to display one or more validation questions associated with the first resource;
    electronically receive, from the computing device of the user, one or more responses to the one or more validation questions;
    determine one or more exceptions to the first resource based on at least the one or more validation questions;
    transmit a third control signal configured to cause a computing device associated with a resource expert to display the one or more exceptions to the first resource;
    electronically receive, via the computing device associated with the resource expert, one or more additional resources in response to the one or more exceptions to the first resource;
    transform the one or more additional resources into one or more multi-dimensional additional resource vectors; and
    update the resource repository with the one or more multi-dimensional additional resource vectors.

2. The system of claim 1, wherein the at least one processing device is further configured to:
    electronically retrieve one or more resources from one or more sources of information;
    transform the one or more resources into the one or more multi-dimensional resource vectors; and
    store the one or more multi-dimensional resource vectors in the resource repository.

3. The system of claim 2, wherein the at least one processing device is further configured to:
    electronically retrieve the one or more multi-dimensional resource vectors from the resource repository;
    initiate one or more clustering algorithms on the one or more multi-dimensional resource vectors;
    generate, using the one or more clustering algorithms, one or more resource data clusters in a high-dimensional space based on at least the one or more multi-dimensional resource vectors.

4. The system of claim 3, wherein the at least one processing device is further configured to:
    initiate the one or more clustering algorithms on the one or more multi-dimensional query vectors; and
    generate, using the one or more clustering algorithms, one or more query data clusters in the high-dimensional space based on at least the one or more multi-dimensional query vectors.

5. The system of claim 4, wherein the at least one processing device is further configured to:

determine the similarity index between the one or more multi-dimensional query vectors and the one or more multi-dimensional resource vectors based on at least determining a distance between the one or more query data clusters and the one or more resource data clusters in the high-dimensional space.

6. The system of claim 5, wherein the at least one processing device is further configured to:
determine that the distance between the one or more query data clusters and a first resource data cluster associated with the first multi-dimensional resource vector in the high-dimensional space is lesser than a predetermined threshold, wherein the first resource data cluster is associated with the one or more resource data clusters; and
rasterize the first multi-dimensional resource vector into the one or more grid of pixels to generate the first resource based on at least determining that the distance between the one or more query data clusters and the first resource data cluster is lesser than the predetermined threshold.

7. The system of claim 1, wherein the at least one processing device is further configured to:
electronically receive, via the real-time resource transmission session, the one or more query strings from the user;
initiate an interpreter engine on the one or more query strings to extract structured information from the one or more query strings;
transform the structured information associated with the one or more query strings into the one or more multi-dimensional query vectors.

8. The system of claim 7, wherein the at least one processing device is further configured to:
electronically receive, via the real-time resource transmission session, a first multi-dimensional query vector, wherein the first multi-dimensional query vector is associated with the one or more multi-dimensional query vectors; and
determine, using a state tracker engine, that a conversation state associated with the real-time resource transmission session has changed from an original conversation state to a first conversation state based on at least receiving the first multi-dimensional query vector.

9. The system of claim 8, wherein the at least one processing device is further configured to:
initiate a policy engine associated with the real-time resource transmission session;
electronically receive, via the policy engine, the first conversation state;
determine one or more actions to be executed in response to the first conversation state, wherein the one or more actions comprises at least displaying the first resource; and
initiate an execution of the one or more actions.

10. The system of claim 9, wherein the at least one processing device is further configured to:
electronically receive, using the state tracker engine, the execution of the one or more actions in response to the first conversation state; and
generate a log indicating the execution of the one or more actions in response to the first conversation state; and
revert, using the state tracker engine, the conversation state associated with the real-time resource transmission session to the original conversation state from the first conversation state in response to generating the log.

11. A computer program product for implementing cognitive self-healing in knowledge based deep learning models, the computer program product comprising a non-transitory computer-readable medium comprising code causing a first apparatus to:
initiate a real-time resource transmission session on a computing device associated with a user;
electronically receive, via the real-time resource transmission session, one or more query strings from the user;
transform the one or more query strings into one or more multi-dimensional query vectors;
electronically retrieve one or more multi-dimensional resource vectors from a resource repository;
determine a similarity index between the one or more multi-dimensional query vectors and the one or more multi-dimensional resource vectors;
determine a first multi-dimensional resource vector associated with at least one of the one or more multi-dimensional resource vectors based on at least the similarity index;
retrieve device configuration information associated with the computing device of the user;
dynamically rasterize the first multi-dimensional resource vector into one or more grid of pixels to generate a first resource based on at least the device configuration information for optimal display of the first resource on the computing device of the user;
transmit a first control signal configured to cause the computing device of the user to display, via the real-time resource transmission session, the first resource;
transmit a second control signal configured to cause the computing device of the user to display one or more validation questions associated with the first resource;
electronically receive, from the computing device of the user, one or more responses to the one or more validation questions;
determine one or more exceptions to the first resource based on at least the one or more validation questions;
transmit a third control signal configured to cause a computing device associated with a resource expert to display the one or more exceptions to the first resource;
electronically receive, via the computing device associated with the resource expert, one or more additional resources in response to the one or more exceptions to the first resource;
transform the one or more additional resources into one or more multi-dimensional additional resource vectors; and
update the resource repository with the one or more multi-dimensional additional resource vectors.

12. The computer program product of claim 11, wherein the first apparatus is further configured to:
electronically retrieve one or more resources from one or more sources of information;
transform the one or more resources into the one or more multi-dimensional resource vectors; and
store the one or more multi-dimensional resource vectors in the resource repository.

13. The computer program product of claim 12, wherein the first apparatus is further configured to:
electronically retrieve the one or more multi-dimensional resource vectors from the resource repository;
initiate one or more clustering algorithms on the one or more multi-dimensional resource vectors;

generate, using the one or more clustering algorithms, one or more resource data clusters in a high-dimensional space based on at least the one or more multi-dimensional resource vectors.

14. The computer program product of claim 13, wherein the first apparatus is further configured to:
   initiate the one or more clustering algorithms on the one or more multi-dimensional query vectors; and
   generate, using the one or more clustering algorithms, one or more query data clusters in the high-dimensional space based on at least the one or more multi-dimensional query vectors.

15. The computer program product of claim 14, wherein the first apparatus is further configured to:
   determine the similarity index between the one or more multi-dimensional query vectors and the one or more multi-dimensional resource vectors based on at least determining a distance between the one or more query data clusters and the one or more resource data clusters in the high-dimensional space.

16. The computer program product of claim 15, wherein the first apparatus is further configured to:
   determine that the distance between the one or more query data clusters and a first resource data cluster associated with the first multi-dimensional resource vector in the high-dimensional space is lesser than a predetermined threshold, wherein the first resource data cluster is associated with the one or more resource data clusters; and
   rasterize the first multi-dimensional resource vector into the one or more grid of pixels to generate the first resource based on at least determining that the distance between the one or more query data clusters and the first resource data cluster is lesser than the predetermined threshold.

17. The computer program product of claim 16, wherein the first apparatus is further configured to:
   electronically receive, via the real-time resource transmission session, the one or more query strings from the user;
   initiate an interpreter engine on the one or more query strings to extract structured information from the one or more query strings;
   transform the structured information associated with the one or more query strings into the one or more multi-dimensional query vectors.

18. A method implementing cognitive self-healing in knowledge based deep learning models, the method comprising:
   initiating a real-time resource transmission session on a computing device associated with a user;
   electronically receiving, via the real-time resource transmission session, one or more query strings from the user;
   transforming the one or more query strings into one or more multi-dimensional query vectors;
   electronically retrieving one or more multi-dimensional resource vectors from a resource repository;
   determining a similarity index between the one or more multi-dimensional query vectors and the one or more multi-dimensional resource vectors;
   determining a first multi-dimensional resource vector associated with at least one of the one or more multi-dimensional resource vectors based on at least the similarity index;
   retrieving device configuration information associated with the computing device of the user;
   dynamically rasterizing the first multi-dimensional resource vector into one or more grid of pixels to generate a first resource based on at least the device configuration information for optimal display of the first resource on the computing device of the user;
   transmitting a first control signal configured to cause the computing device of the user to display, via the real-time resource transmission session, the first resource;
   transmitting a second control signal configured to cause the computing device of the user to display one or more validation questions associated with the first resource;
   electronically receiving, from the computing device of the user, one or more responses to the one or more validation questions;
   determining one or more exceptions to the first resource based on at least the one or more validation questions;
   transmitting a third control signal configured to cause a computing device associated with a resource expert to display the one or more exceptions to the first resource;
   electronically receiving, via the computing device associated with the resource expert, one or more additional resources in response to the one or more exceptions to the first resource;
   transforming the one or more additional resources into one or more multi-dimensional additional resource vectors; and
   updating the resource repository with the one or more multi-dimensional additional resource vectors.

* * * * *